United States Patent [19]

Majumdar et al.

[11] Patent Number: 5,073,197

[45] Date of Patent: * Dec. 17, 1991

[54] CEMENT COMPOSITIONS

[75] Inventors: Amalendu J. Majumdar, St. Albans; Bahadur Singh, Watford, both of England

[73] Assignee: National Research Development Corporation, London, England

[*] Notice: The portion of the term of this patent subsequent to Oct. 9, 2007 has been disclaimed.

[21] Appl. No.: 388,798

[22] Filed: Aug. 3, 1989

[30] Foreign Application Priority Data

Aug. 12, 1988 [GB] United Kingdom ............... 8819212
Oct. 12, 1988 [GB] United Kingdom ............... 8823890

[51] Int. Cl.$^5$ .......................... C04B 7/14; C04B 7/32
[52] U.S. Cl. .................................... 106/692; 106/693; 106/695; 106/705; 106/707; 106/789
[58] Field of Search ............... 106/104, 692, 693, 695, 106/789, 705, 707

[56] References Cited

U.S. PATENT DOCUMENTS

| 1,803,582 | 5/1931 | Zucco ................................ 106/692 |
| 4,605,443 | 8/1986 | MacDowell ....................... 106/692 |
| 4,961,787 | 10/1990 | Majumdar et al. ................ 106/692 |

FOREIGN PATENT DOCUMENTS

| 443460 | 1/1972 | Australia . |
| 0113593 A2 | 7/1984 | European Pat. Off. . |
| 0241230 | 10/1987 | European Pat. Off. . |
| 1198723 | 8/1965 | Fed. Rep. of Germany . |
| 2534564 | 2/1977 | Fed. Rep. of Germany ...... 106/104 |
| 797493 | 4/1936 | France . |
| 53-073220 | 6/1978 | Japan ................................ 106/104 |
| 54-064551 | 4/1984 | Japan ................................ 106/104 |
| 60-071569 | 4/1985 | Japan ................................ 106/104 |
| 60-158269 | 8/1985 | Japan ................................ 106/104 |
| 0258902 | 5/1970 | U.S.S.R. ........................... 106/104 |
| 10312 | 7/1888 | United Kingdom . |
| 957094 | 5/1964 | United Kingdom . |
| 995348 | 6/1965 | United Kingdom . |
| 2099808 A | 12/1982 | United Kingdom . |
| 21533341 | 6/1987 | United Kingdom . |
| 2188923 A | 10/1987 | United Kingdom . |
| 2211182 A | 6/1989 | United Kingdom . |
| 85-003070 | 7/1985 | World Int. Prop. O. .......... 106/104 |

OTHER PUBLICATIONS

F. M. Lea "The Chemistry of Cement . . . ", E. Arnold 1970, SEN 7131,2277 3, pp. 497–496, Vuillemin, The Use of Mixtures . . . , vol. CVIII, No. 18, 2 May 1936 (translation from French).
Locher, "Hydraulic Properties . . . ", 4th Intl Symp. on the Chem. of Cement, Washington, D.C. 1960, pp. 267–276.
Sugi, et al., "Fundamental Experiments . . . ", Cement Assoc. of Japan, 1976 Proc., 73–76.
Neville, "HAC Concrete", Construction Press (1975) p. 14.
Rao et al., "Mechanism of Formation of Strätlingite . . . ", Zement-Kalk-Gips, vol. 33, No. 6, 1980 pp. 292–293.
Chemical Abstracts vol. 99, 1983, p. 278, Abstract #109840u.
Chemical Abstracts vol. 66, 1967 p. 1355, Abstract #13829q.

Primary Examiner—William R. Dixon, Jr.
Assistant Examiner—Anthony J. Green
Attorney, Agent, or Firm—Nixon & Vanderhye

[57] ABSTRACT

The advantages of high alumina cement (early strength, resistance to sulphate attack) are preserved and its disadvantage (weakens with age) is solved by mixing it 50:50 with silica fume, gasifier slag, fly ash or other pozzolanic or latently hydraulic material. This encourages formation of gehlenite octahydrate in preference to the harmful 'conversion' (weakening) reaction.

19 Claims, No Drawings

CEMENT COMPOSITIONS

This invention relates to cement compositions; more particularly, this invention relates to hydraulic cement-forming compositions comprising high alumina cement, and to hardened masses formed therefrom by addition of water.

Two types of high alumina cements (HAC) are in common use; the first type, and the one used in civil engineering, is light grey to black in colour and is made from bauxite. In the UK the cement is sold under the name Ciment Fondu. The second (pure) type of HAC, white in colour, of which one brand name is Secar 71, is made from alumina and is used as the bonding agent for castable refractories in high temperature applications. It is also used in the manufacture of refractory concrete. The cementive properties of HACs derive, in the main, from calcium aluminates. As is standard cement nomenclature, the following abbreviations will be used herein: $C=CaO$; $A=Al_2O_3$; $S=SiO_2$; $H=H_2O$. In both types of HAC, monocalcium monoaluminate ($CaO \cdot Al_2O_3$ thus CA) is a principal phase. In Ciment Fondu the other consitituents are $C_{12}A_7$, $C_2S$, melilite, ferrite, pleochroite and small amounts of FeO while in the purer white HAC, $CA_2$ is the only other major phase in addition to CA. (Secar 71 analyses as: 54% $CA_2$+45% $CA$+1% $C_{12}A_7$).

The hydration of CA, which leads to cementive action (in e.g. 4 hours at 20° C.), initially produces $CAH_{10}$ and $C_2AH_8$; hydrated alumina in either gel or microcrystalline form is also produced. The hydration of $CA_2$ proceeds more slowly (e.g. one month) but yields the same hydrate phases. Under usual ambient conditions the decahydrate is the principal initial hydration product (39% after three months) but it 'converts' to $C_3AH_6$ at a rate which depends on environmental conditions such as humidity and temperature. The rate of 'conversion' is also dependent on the amount of water initially present during hydration. Concrete made from HAC using a high water/cement ratio and exposed to high humidity at temperatures exceeding 25° C. shows rapid 'conversion'.

One effect of the 'conversion' phenomenon in HAC is loss of compressive strength, and such reductions in the strength of HAC (Ciment Fondu) concrete used under unfavourable environmental conditions (notably, swimming pool roofs) led to several structural failures in the UK in the 1960s. Consequently, Ciment Fondu is no longer recommended for structural use. Concrete made from white HAC and used at high temperatures as a refractory material does not suffer from 'conversion' as, in use, the material is largely anhydrous.

HAC has several important technical advantages over the more commonly used Portland cements, the principal ones being rapid development of strength at early ages and the resistance to certain types of chemical attack, notably attack by sulphates. If the reduction in the strength of the cement following 'conversion' can be arrested, the current applications of HAC might be widened.

U.S. Pat. No. 4,605,443 MacDowell teaches a hydraulic cement comprising a glass of defined $SiO_2$: $Al_2O_3$: CaO composition which, when contacted with water, hydrates to form crystals composed predominantly of hydrogarnet solid solution and/or hydrogehlenite with essentially no subsequent conversion. However, this involves three general steps: (1) a batch for a glass of a desired composition is melted; (2) the glass melt is cooled sufficiently rapidly to form a glass body; and (3) the glass body is comminuted to very finely-divided particles. Such procedures are expensive and unusual.

A much less radical departure, and more acceptable to normal production methods in the industry, is to use bulk commercially available starting materials and to blend them. Ground high-alumina cement clinker (a 90% or more crystalline product—not a glass) is one such material. This invention seeks to provide a HAC-forming composition exhibiting enhanced compressive strength retention, especially in hot and/or wet environments.

According, therefore to one aspect of this invention there is provided a hydraulic cement-forming composition which comprises a high-alumina cement blended with a latently hydraulic or pozzolanic material other than solely blast furnace slag (for which see our published UK Patent Application GB 2211182A) such that, upon hydration of the composition, gehlenite octahydrate $C_2ASH_8$ is formed. This may be from, or in preference to, $CAH_{10}$ and to the substantial inhibition or exclusion of hydrogarnet $C_3AH_6$. A minimum proportion, such as 5 wt %, of gehlenite octahydrate may be necessary, or such proportion as has a sensible influence on the cement microstructure (such as porosity), or its formation is preferably deferred until the composition is a mature paste (i.e. has hardened).

Various latently hydraulic or pozzolanic materials may be suitable, such as microsilica ('silica fume'), a byproduct of ferrosilicon metallurgy, gasifier slag, pulverised fuel or fly ash, and pozzolan in particular natural Pozzolan. (Crystalline silica such as sand does not count as pozzolanic.)

The hydraulic cement-forming composition may comprise from 30 to 70% by weight of a high-alumina cement blended with from 70 to 30% by weight of said material.

The high alumina cement may have a composition comprising CaO in an amount from 35 to 45% by weight; and $Al_2O_3$ in an amount from 38 to 55% by weight.

The said material may contain non-crystalline i.e. Pozzolanic silica of at least 30% by weight and preferably not exceeding 50%, such as 32-45%. Alumina may be 12-25%, more preferably 16-21%. Lime may be up to 40%, preferably 10-35%.

The said material may be partly (not wholly) replaced by a granulated blast furnace slag which preferably has a composition comprising CaO from 28 to 50% by weight; $SiO_2$ from 28 to 38% by weight; and $Al_2O_3$ from 10 to 24% by weight.

By "granulated blast furnace slag" (GBFS) is meant herein the glassy by-product obtained in the manufacture of pig-iron which is quenched in water or steam-cooled or pelletised (e.g. as sold by Tarmac), as opposed to air-cooled slag, which is crystalline, and which does not in the main participate chemically in cement but acts rather as inert filler. The GBFS is of the composition suitable for use with Portland cement in blended cement and comprises lime, silica and alumina. It may also contain minor amounts of other components including magnesia, iron and manganese oxides and some sulphide. As may be seen from FM Lea "The Chemistry of Cement and Concrete" Arnold 1970, the percentage by weight of each component will generally lie within the range:

CaO: 28% to 50%
SiO$_2$: 28% to 38%
Al$_2$O$_3$: 10% to 24%
MgO: up to 21%
Fe$_2$O$_3$: up to 4%
MnO: up to 3%
Sulphur: up to 3%

The granulated blast furnace slag should suitably have a specific surface (Lea and Nurse) >3,500 cm$^2$g$^{-1}$, desirably >4,000 cm$^2$g$^{-1}$ and preferably >4,300 cm$^2$g$^{-1}$. When ground down to these standards, it is known as "ground granulated blast furnace slag" (GGBFS).

This invention may be practised with any high-alumina cement. Suitably, as may be seen from FM Lea (ibid), the high-alumina cement has a composition comprising CaO in an amount from 35 to 45% by weight and Al$_2$O$_3$ in an amount from 38 to 55% by weight. Where enhanced strength is required, or the use envisaged is in a refractory application such as to produce a castable refractory or in the manufacture of refractory concrete, it is preferable to use a white high-alumina cement; that is, one in which the only major phases present are CA and CA$_2$.

In accordance with a preferred aspect of the invention it is desirable that the high-alumina cement is present in an amount from 60 to 40% by weight of the hydraulic cement-forming composition; preferably, the amount is from 55 to 45% by weight.

Where appropriate, chemical additives such as superplasticisers and wetting agents may be used.

This invention also provides a hydraulic cement-forming composition as herein described which also comprises sand and/or aggregate.

This invention further provides a method of forming a cementitious mass, comprising adding water to a composition as herein described, and also provides a hardened cementitious mass formed by addition of water to a composition as herein described, for example placed as a floor screed.

After careful durability studies, the compositions set forth above according to the invention may possibly become contemplated for other civil engineering applications, such as cast products.

The following Examples illustrate the invention.

In each Example, a 10 mm cube of 'Ciment Fondu' plus the individual material added according to that Example was made using a water/cement ratio as indicated (0.3 to 0.5).

EXAMPLE A

Gasifier Slag

Gasifier slag is a glassy frit formed as a quenched by-product in the British Gas/Lurgi slagging gasification process for the production of substitute natural gas (SNG) from coal. The slags have cementitious properties when ground to fine powders and show promise as partial replacement for cement in concretes. The chemical analysis of the slag used in the present work is given in Table 1.

EXAMPLES B1 AND B2

Pulverized Fuel or Fly Ash

These ashes are waste products from coal-burning power stations. The chemical composition of the fly ash depends very strongly on the composition of the coal used. Two examples are given in Table 1. The low-lime fly ash is of U.K. origin (Example B1) and the high-lime fly ash was obtained from the U.S.A. (B2) and, as will be seen later, higher lime contents appear to be advantageous in this invention.

EXAMPLE C

Microsilica

Condensed silica fume is collected in the form of an ultrafine powder of microsilica (typical specific surface are ~¼ million cm$^2$/g) as a by-product in the manufacture of silicon and ferro-alloys. The material is strongly pozzolanic. The microsilica (silica fume) used in this study was supplied by Elchem Ltd of High Wycombe, U.K.

EXAMPLE D

Italian Pozzolan

This natural pozzolan came from Italy and is described as "Pozzolana Di Salone". It is of volcanic origin, of large surface area (8240 cm$^2$/g) and consists of glass intermixed with quartz, feldspar, zeolites and pyroxenes. The chemical analysis of the material is given in Table 1.

TABLE 1

| | | Chemical analysis of added material | | | | | | | | | | | | |
|---|---|---|---|---|---|---|---|---|---|---|---|---|---|---|
| | | Percentage by weight | | | | | | | | | | | | |
| Ex | Material | SiO$_2$ | Al$_2$O$_3$ | Fe$_2$O$_3$ | CaO | MgO | Na$_2$O | K$_2$O | TiO$_2$ | P$_2$O$_5$ | Mn$_3$O$_4$ | Cr$_2$O$_3$ | BaO | SO$_3$ | LOI |
| A | Gasifier slag | 32.50 | 20.10 | 5.82 | 34.20 | 1.24 | 3.85 | 0.87 | 0.92 | 0.37 | 0.03 | 0.03 | 0.10 | 1.6 | — |
| B1 | PFA (UK) | 49.30 | 24.80 | 9.60 | 3.35 | 2.13 | 1.17 | 3.88 | 0.82 | 0.21 | 0.07 | — | — | 0.62 | 3.03 |
| B2 | PFA (USA) | 39.70 | 17.50 | 5.92 | 24.20 | 5.29 | 1.40 | 0.48 | 1.21 | 0.88 | 0.05 | — | 0.70 | 1.60 | 0.36 |
| D | Italian Pozzolan | 44.51 | 16.26 | 9.70 | 10.29 | 4.03 | 1.70 | 5.73 | 0.80 | — | 0.20 | — | — | 0.003 | 6.60 |
| — | HAC (for comparison) | 3.60 | 38.05 | 1.65 | 39.21 | 0.27 | 0.11 | 0.02 | 1.65 | 0.05 | 0.01 | 0.29 | 0.04 | — | — |

LOI = loss on ignition
PFA = Pulverized fly ash
Hac = high aluminia cement

In each Example, the cubes were cured following the procedure described in our published Patent Application GB 2211182A. The cubes were stored under water at 20° C. and 40° C. and their compressive strengths were determined at specified times. The results are given in Table 2. The phases present in the various pastes before and after hydration were identified by X-ray diffraction.

TABLE 2

Compressive strength of 10 mm cubes made from mixtures of HAC and other materials stored under water

| EX | weight ratio | Mixture | W/S ratio | 24 hrs moist air | Compressive Strength in MPa | | | | | | | |
|---|---|---|---|---|---|---|---|---|---|---|---|---|
| | | | | | 7 days water at | | 28 days water at | | 180 days water at | | 1 year water at | |
| | | | | | 20° C. | 40° C. | 20° C. | 40° C. | 20° C. | 40° C. | 20° C. | 40° C. |
| A | 40/60 | HAC + Gasifier Slag | 0.30 | 74 | 85 | 86 | 103 | 96 | 114 | 94 | | |
| B1 | 60/40 | HAC + PFA (UK) | 0.30 | 59 | 66 | 29 | 76 | 36 | 93 | 42 | 73 | 35 |
| B2 | 50/50 | HAC + PFA (USA) | 0.30 | 50 | 71 | 89 | 85 | 86 | | | | |
| C | 60/40 | HAC + Silica Fume | 0.50 | 18 | 26 | 18 | 35 | 19 | 37 | 27 | | |
| D | 50/50 | HAC + Italian Pozzolan | 0.40 | 45 | 52 | 38 | 65 | 32 | | | | |

It is clear from Table 2 that in all cases when the mixtures according to the invention were kept under water at 20° C. their strengths increased relative to the values obtained after 24 hours in moist air. In some cases, e.g. Example A with gasifier slag and Example C with microsilica, the increasing trend was maintained up to 180 days. For storage under water at 40° C., HAC blends containing either gasifier slag or silica fume (Examples A and C) have given strength results after 180 days that are appreciably higher than their initial 24 hour strengths, and likewise (after 28 days) the HAC blend containing the flyash from U.S.A. (Example B2).

It is important to remember in this context that, when kept under water at 40° C., HAC on its own loses a significant proportion of its initial strength after only a few days due to the 'conversion' reactions. It is justifiable, therefore, to propose that the additions described herein modify the hydration and/or the conversion reactions of HAC in a way that is similar to that produced by ground granulated blast furnace slag the subject of our GB 2211182A. Gehlenite hydrate ($C_2ASH_8$) has been identified in many of the hydrated blended HAC samples.

We claim:

1. A hydraulic cement-forming composition consisting essentially of from 30 to 70% by weight of a high-alumina cement having a composition comprising CaO in an amount from 35 to 45% by weight and $Al_2O_3$ in an amount from 38 to 55% by weight blended with from 70 to 30% by weight of a latently hydraulic or pozzolanic material, said latently hydraulic or pozzolanic material being other than solely blast furnace slag and being selected from gasifier slag, pulverized fuel ash, fly ash and natural pozzolan such that, upon hydration of the composition, gehlenite octahydrate is formed.

2. A hydraulic cement-forming composition according to claim 1, wherein the proportion of gehlenite octahydrate in mature pastes exceeds 5 wt %.

3. A hydraulic cement-forming composition according to claim 1 wherein the high-alumina cement is present in an amount from 60 to 40% by weight.

4. A hydraulic cement-forming composition according to claim 1 wherein the high-alumina cement is in the form of ground clinker.

5. A hydraulic cement-forming composition according to claim 1, wherein said material is pulverized fuel ash.

6. A hydraulic cement-forming composition according to claim 1 wherein the said material contains at least 30% by weight pozzolanic silica.

7. A hydraulic cement-forming composition according to claim 1 wherein the said material contains at most 50% by weight pozzolanic silica.

8. A hydraulic cement-forming composition according to claim 1, wherein the said material contains 32-45% pozzolanic silica.

9. A hydraulic cement-forming composition according to claim 1 wherein the said material contains 12-25% alumina.

10. A hydraulic cement-forming composition according to claim 9, wherein the said material contains 16-21% alumina.

11. A hydraulic cement-forming composition according to claim 1 wherein the said material contains up to 40% lime.

12. A hydraulic cement-forming composition according to claim 11, wherein the said material contains 10-35% lime.

13. A hydraulic cement-forming composition according to claim 1 wherein part of said material is granulated blast furnace slag.

14. A hydraulic cement-forming composition according to claim 13, wherein the granulated blast furnace slag has a composition comprising CaO from 28 to 50% by weight; $SiO_2$ from 28 to 38% by weight; and $Al_2O_3$ from 10 to 24% by weight.

15. A hydraulic cement-forming composition according to claim 13 wherein the granulated blast furnace slag has a specific surface area exceeding 3,500 $cm^2 g^{-1}$.

16. A hydraulic cement-forming composition according to claim 1 which also consists essentially of aggregate in an amount sufficient to form a cementitious mass.

17. A method of forming a cementitious mass, said method comprising the step of adding water to a hydraulic cement-forming composition consisting essentially of from 30 to 70% by weight of a high-alumina cement having a composition comprising CaO in an amount from 35 to 45% by weight and $Al_2O_3$ in an amount from 38 to 55% by weight blended from 70 to 30% by weight of a latently hydraulic or pozzolanic material, said latently hydraulic or pozzolanic material being other than solely blast furnace slag and being selected from gasifier slag, pulverized fuel ash, fly ash and natural pozzolan such that, upon hydration of the composition, gehlenite octahydrate is formed, to thereby form said cementitious mass.

18. A hardened cementitious mass formed by addition of water to a composition according to claim 1, said water being present in an amount sufficient to facilitate hardening of the cementitious mass.

19. A hardened cementitious mass according to claim 18 which is a floor screed.

* * * * *